UNITED STATES PATENT OFFICE.

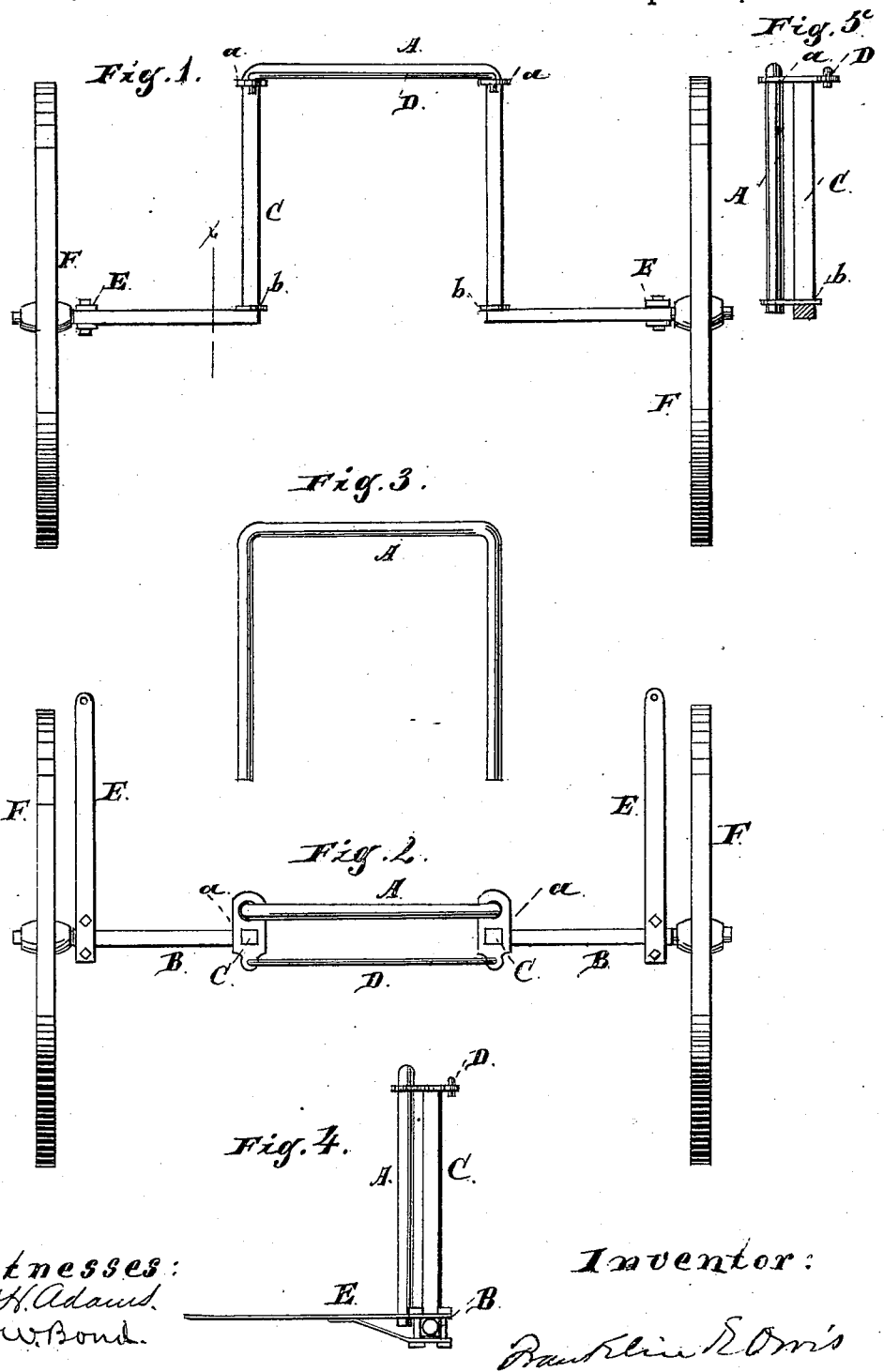

FRANKLIN K. ORVIS, OF DIXON, ILLINOIS.

CULTIVATOR.

SPECIFICATION forming part of Letters Patent No. 275,847, dated April 17, 1883.

Application filed October 16, 1882. (No model.)

*To all whom it may concern:*

Be it known that I, FRANKLIN K. ORVIS, residing at Dixon, in the county of Lee and State of Illinois, and a citizen of the United States, have invented a new and useful Improvement in Cultivators, of which the following is a full description, reference being had to the accompanying drawings, in which—

Figure 1 is a rear elevation; Fig. 2, a plan; Fig. 3, an elevation of the central arch; Fig. 4, a side elevation of the parts therein shown; Fig. 5, section of line $x$ of Fig. 1.

My improvement relates to two-wheeled tongueless straddle-row cultivators of the class commonly known as "parallel" cultivators; and it consists in an arched axle made in three parts, hinged together, and combined with a connecting-rod, and in the combination of parts, all as hereinafter set forth and claimed as new.

In the drawings, A represents the central portion of an arched axle. To each side of the central arch, A, is pivoted or hinged a portion of the axle, consisting of a horizontal part, B, and a vertical part, C. The upper end of each part C is rigidly connected with a bearing-plate, $a$, which projects forward of and also to the rear of the vertical part C. At or near the lower end of the vertical part C is another bearing-plate, $b$, rigidly attached to C, and projecting forward therefrom. The forward projections of the bearing-plates $a\ b$ are provided with holes, through which the central arch, A, which is round, passes somewhat loosely, the lower ends of such arch A projecting below the plates $b\ b$, and being held in place by nuts or in any other suitable manner. The rear ends of the bearing-plates $a$ are provided with holes, in which the ends of the connecting-rod D are loosely placed.

E are draft-bars, the rear ends of which, as shown, clasp the horizontal portions B B of the axle, and are secured thereto by bolts.

F are the wheels.

The parts B C of the axle may be square, except at the outer ends of B B, where the wheels are mounted.

I have not shown the shovel-beams; but their forward ends are to be connected by means of any suitable known couplings to the horizontal parts B B of the axle, and should have the necessary vertical and lateral motion.

As shown, the vertical parts C are located directly in the rear of the vertical portion of the central arch, A. This precise arrangement is not essential; but the parts must be so combined that the horizontal part of the arch A, the rod D, and the bearing-plates $a$ will form, in effect, a parallel rule, whereby the wheels will be maintained in lines parallel to each other, although one may be drawn somewhat in advance of the other, which frequently happens in using this class of cultivators. If the position of the vertical parts of the axle be changed, it will be necessary to change the form of the upper bearing-plates, and perhaps, also, the form of the lower bearing-plates; but the changes required can be made readily by any mechanic skilled in the art.

The arch A might be rigidly secured to the bearing-plates, in which case the vertical parts C must be journaled in such bearing-plates.

I am aware that the wheels of a cultivator have been connected by devices which constitute, in effect, a parallel-rule motion—as, for example, by swiveling the wheel-carriages to the ends of arched bars arranged side by side, or parallel to each other, so that the wheel-carriages have independent forward and backward movements, but are retained in lines parallel to each other. Such features are not, therefore, broadly claimed by me.

What I claim as new, and desire to secure Letters Patent, is as follows:

1. In a cultivator, an arched axle consisting of a central arch and two side pieces, each side piece composed of a horizontal portion, B, and a vertical portion, C, and bearing-plates connecting the three parts of the axle, in combination with a rod, D, connecting the upper bearing-plates, the horizontal portion of the central arch, and the connecting-rod, forming, in connection with the upper bearing-plates, in effect, a parallel rule, substantially as and for the purpose specified.

2. In a cultivator, an arched axle consisting of a central arch and two side pieces, each side piece composed of a horizontal portion, B, and a vertical portion, C, bearing-plates connecting three parts of the axle, and rod D, connecting the upper bearing-plates, in combination with draft-bars E, attached directly to the horizontal parts B of the axle, substantially as and for the purposes specified.

FRANKLIN K. ORVIS.

Witnesses:
E. A. WEST,
ALBERT H. ADAMS.